UNITED STATES PATENT OFFICE.

OTTO N. BERNDT, OF CHICAGO, ILLINOIS, ASSIGNOR TO LINDSAY LIGHT COMPANY, OF CHICAGO, ILLINOIS, A CORPORATION OF ILLINOIS.

ART OF RECOVERING THORIUM.

1,329,747.   Specification of Letters Patent.   Patented Feb. 3, 1920.

No Drawing.   Application filed June 26, 1919. Serial No. 306,778.

*To all whom it may concern:*

Be it known that I, OTTO N. BERNDT, a citizen of the United States, residing at Chicago, in the county of Cook and State of Illinois, have invented a new and useful Improvement in the Art of Recovering Thorium, of which the following is a specification.

The present invention relates to the art of recovering thorium from its natural mineral sources and more particularly from monazite sand.

In accordance with the present invention a concentration of the thorium content of the mineral, such as monazite sand, is effected by the use of fuming sulfuric acid. It is preferred that the action of the acid upon the monazite sands takes place under controlled conditions as to relative proportions, temperatures, and time, for the maximum efficiency and economy of the process. As a result of continued action of fuming sulfuric acid upon the sands an insoluble compound of thorium is formed whereas the compounds formed by the rare earth metals and by other constituents of the sands are largely soluble in water or dilute acid. On treatment of the mass resulting from the action of the fuming sulfuric acid upon monazite sand with water in suitable proportions, and separation of the soluble constituents of the mass, the insoluble residue will contain the thorium in greatly concentrated form.

The treatment of the monazite sand or other phosphatic compound of thorium with the fuming sulfuric acid is carried out in suitable pots, preferably provided with stirring apparatus and with the application of heat, which results in a gradual rise in temperature at a rate depending upon the heat applied. On attaining a temperature between 200° and 230° C. the temperature rises more rapidly to between 325 and 350° C., at which the completion of the reaction is indicated by a change of color of the reaction mass to a greenish yellow color. This mass, as above stated, contains substantially all of the thorium content of the sands in an insoluble form.

In carrying out the process of my invention I have found that a great economy of materials and of heat and a high efficiency of equipment may be attained by the use of fairly definite proportions of the reacting materials and by a suitable control of the temperature of treatment. Thus, in practising the invention I prefer the following procedure:

500 pounds of monazite sand, which has been concentrated by means of a magnetic separator to remove ilmenite and other magnetic constituents and contains about 9% thorium oxid, are treated with more than 425 pounds of fuming sulfuric acid stronger than 66° Bé., containing preferably about 5% excess sulfur trioxid. In general 475 pounds of such acid is a suitable amount. The mixture is heated for a period sufficient to decompose the sands and to convert the thorium into an insoluble compound, the heating preferably being at such a rate that a temperature of 200 to 230° C. is reached in between 3 to 4 hours. The rate of heating, however, may be such that this temperature is reached in from three to six hours. At this point the rise in temperature becomes more rapid, due probably to heat evolved by the reacting mass in substantial amounts, attaining a temperature of 300 to 350° C. in from one half to one hour. The reaction mass becomes greenish yellow in color and is in stiff plastic state, capable of being further stirred. At this point external heating is stopped and the mass is permitted to cool for several hours while being stirred and is removed from the baking pot or digester. The product is a thick pasty mass, greenish yellow in color, and weighing about 950 pounds, but should weigh not more than 1000 pounds and not less than 900 pounds.

The mass removed from the digesters is treated in suitable tanks with a sufficient quantity of water, preferably about 900 gallons for the above amount. A slight agitation of the solution which has a slight acidity will keep the insoluble thorium compound in suspension while the heavier silicious residues will settle to the bottom. The suspension of the thorium compound may be decanted and filtered, the thorium compound remaining as a residue on the filter in a greatly concentrated state and suitable for further purification.

It is readily apparent that the proportions of the reacting materials may be varied in accordance with the proportional amounts of thorium and impurities in the sand and the $SO_3$ (sulfur trioxid) content of the fuming acid. In the specific example above given a sand containing about 9% monazite is referred to.

While the above description relates to fuming sulfuric acid containing about 5% excess sulfur trioxid $SO_3$, the successful practice of the process is not restricted to this specific proportion of sulfur trioxid. Acid containing a larger or smaller proportion of sulfur trioxid may be used, with corresponding variations of the proportional amounts used.

Although I have set forth the process of my invention in connection with certain details of one method of carrying out the same, these are to be regarded as illustrative only and not as limitations upon the scope of the invention except in so far as such limitations are included in the accompanying claims.

I claim:

1. The process of treating a phosphatic thorium compound which consists in subjecting the compound to the continued action of fuming sulfuric acid, in such manner as to decompose the sands and convert the thorium present into an insoluble compound.

2. The process of treating a phosphatic thorium compound which consists in subjecting the compound to the continued action of fuming sulfuric acid at an elevated temperature, thereby decomposing the sands and converting the thorium present into an insoluble compound.

3. The process of treating monazite sands which consists in treating the sands with fuming sulfuric acid in such a manner as to decompose the sands and produce an insoluble thorium compound and removing the soluble decomposition products from said compound.

4. The process of treating monazite sands which consists in treating the sands with fuming sulfuric acid in such manner as to decompose the sands and produce an insoluble thorium compound and subjecting the resulting mixture to the action of a dilute acid solution to remove the soluble constituents thereof from the thorium compound.

5. The process of treating monazite sands which consists in adding fuming sulfuric acid thereto, applying heat to the mixture to produce a rise in the temperature thereof until substantial amounts of heat are evolved by the reaction mass and continuing the application of heat to complete the conversion of the thorium to an insoluble compound.

6. The process of treating monazite sand which consists in admixing the sand with at least 85% of its weight of fuming sulfuric acid and heating the mixture to convert the thorum present into an insoluble compound.

7. The process of treating monazite sand which consists in admixing monazite sand and fuming sulfuric acid, heating the mixture gradually to a temperature of 200–230° C. and permitting the temperature of the mixture to rise rapidly until the thorium is converted into an insoluble compound.

8. The process of treating monazite sand which consists in admixing monazite sand with more than 85% of its weight of fuming sulfuric acid, applying heat to the mixture to raise its temperature to 200–230° C. in three to four hours, the reaction mass thereby being brought to a stage at which heat is evolved by it, continuing the application of heat to increase the temperature of the mass rapidly to 300–330° C. and permitting the mass to cool.

OTTO N. BERNDT.